June 15, 1943.   S. M. RENKIN   2,321,702
CHAIN WHEEL
Filed Nov. 19, 1942
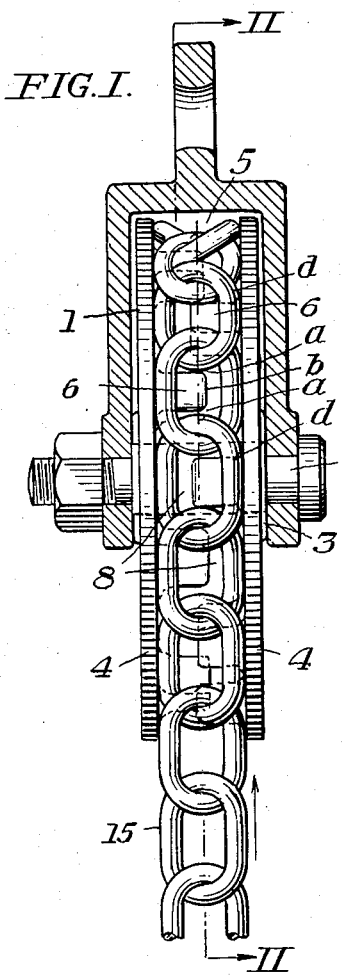
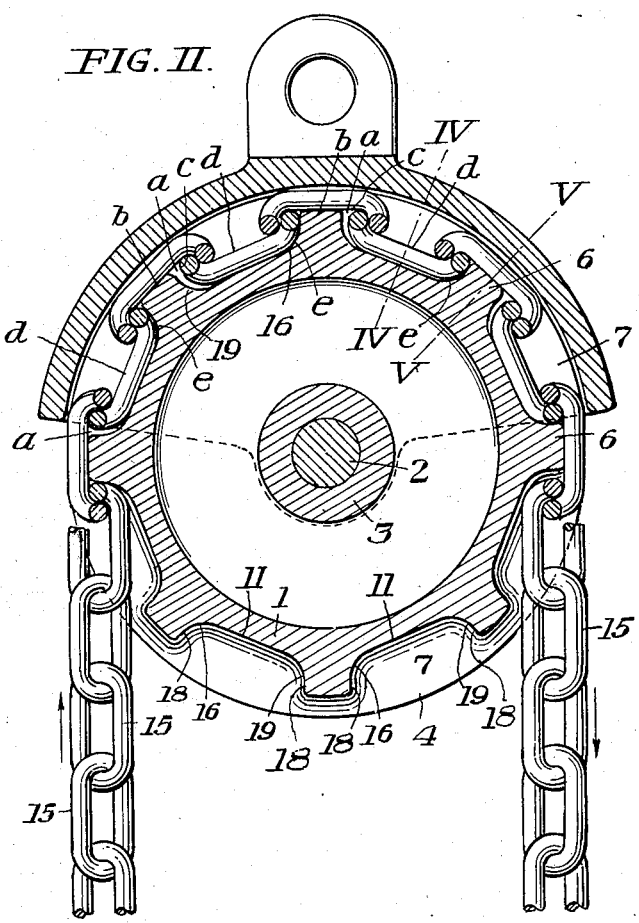
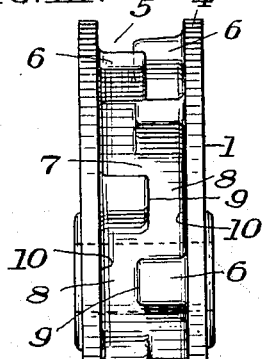
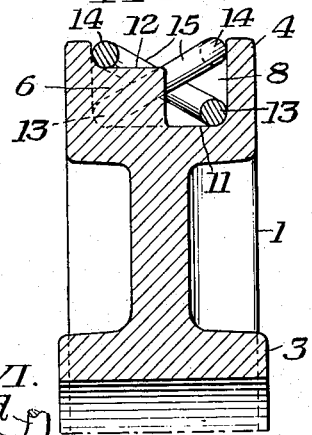
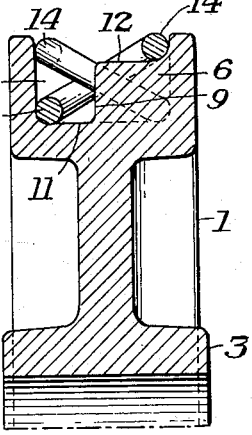
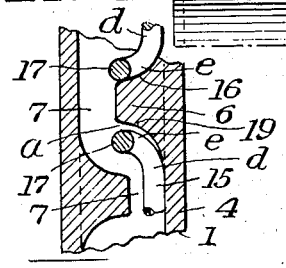
INVENTOR
Samuel M. Renkin
by William B. Wharton
his attorney Patented June 15, 1943

2,321,702

UNITED STATES PATENT OFFICE 2,321,702

CHAIN WHEEL

Samuel M. Renkin, Pittsburgh, Pa.

Application November 19, 1942, Serial No. 466,205

5 Claims. (Cl. 74—243)

This invention relates to chain wheels, that is to say wheels over the peripheries of which pass chains as the wheels rotate, particularly to such a wheel for use with a chain, normally of oval link type, wherein the links are freely connected by interlooping of the adjacent links.

The object of the invention is to provide in such wheels a configuration of the chain-supporting surfaces that permits a chain to enter and leave a wheel smoothly and quietly, and without producing whipping and snaking of a running reach of chain freely hanging from such a wheel, and furthermore a configuration that permits entry and leaving of a chain without its distortion from the position that it normally assumes under the influence of a load applied to it transversely. It is a further object to provide such a specialized configuration that is capable of practical manufacture by simple molding and casting methods.

In the prior art the structure of such wheels has comprised a peripheral surface having spaced pockets of the approximate shape of the links for reception of alternate links lying with the planes bounding their broad sides at right angles to diameters of the wheel, and a central groove for receiving the intervening links in edge-on positions, at right angles to the links lying in the pockets. The loose interlooping of the successive chain links permits the alternate links that enter the groove to play relative to the adjacent links in the pockets. As the chain enters and leaves the wheel this relative motion of the alternate links, and the contact of the chain with the wheel parts, sets up a whipping motion in the chain, which motion leads to excessive wear of the chain and wheel, prevents smooth running of the chain, and produces a great deal of noise. The condition is aggravated when the organization is one wherein a load is applied transversely upon a bight or horizontal reach of chain, since such conditions impose a twist upon the chain between the load point, where the adjacent links assume opposite equal acute angular positions, and the wheel, where they must assume right angular positions.

The wheel arrangement herein disclosed avoids these disadvantageous features by presenting a specialized peripheral surface over which the chain passes with absolute smoothness, due to lack of distortion of the positions of the links and because each link is positively positioned and supported by surfaces of the wheel during its passage over the wheel. The surface also is so arranged as to provide a positive driving contact between the wheel and each link, so that relative movement in the direction of travel between the wheel and any link engaged with it is positively prevented.

In the accompanying drawing:

Fig. I is an edge view of a chain and wheel assembly, the wheel guard being broken to show the chain-engaging surface of the wheel in elevation.

Fig. II is a sectional view on line II of Fig. I.

Fig. III is an edge elevation of the wheel.

Figs. IV and V are sectional views respectively on lines IV—IV and V—V of Fig. II.

Fig. VI is a fragmentary sectional view taken at the base of a link-supporting projection.

Describing the drawing, in detail, a wheel embodying this invention is designated by the reference numeral 1, such body being circular and arranged for rotation about a shaft 2 on suitable bearings 3. The periphery of the body 1 is provided with spaced walls 4 enclosing between them a chain-receiving channel 5, that is extended peripherally of the wheel. To support the links of a chain trained over the wheel, in such a manner that the position of the chain is untwisted and symmetrically supported on the wheel and in the positions which they assume under a load applied transversely to the chain, and thereby avoid the wear and damage incidental to distorting the positions of the links as they enter and leave the wheels of the prior art, each wall 4 is provided with a series of peripherally spaced projections 6 that extend transversely into the channel 5, and intervening recesses 7. The projections 6 of each wall 4 are arranged opposite the recesses 7 of the other wall, so that there is a peripheral succession of projections 6 extended alternately from the opposite walls into the channel, and each projection is opposite a recess 7 of the other wall, a space 8 intervening between the edge surface 9 of the projection and the inner surface 10 of the opposite wall.

Each recess 7 has a bottom surface 11, and each projection 6 has a top surface 12 that is spaced outwardly from the bottom surface 11 of the recess to which the projection is opposed. These surfaces respectively underlie the opposite side reaches 13 and 14 of a link 15 of a chain lying in the channel, so that the side reach 14 is supported in a position spaced outwardly from the position of the side reach 13 which lies in the space 8 and rests on the bottom surface 11 of the recess. The links are tilted by this spaced support of their side reaches on the surfaces of the recesses and projections, and as the succeeding pairs of recesses and projections are reversed, due to the extension of adjacent projections from the opposite side walls 4, adjacent links of a chain trained over the wheel are tilted in opposite directions at angles fixed by the spacing of the surfaces 11 and 12. This spacing is adjusted according to the width of the chain links with which the particular wheel is to be used. The particular angular relation of the links may vary considerably, the important characteristic being the disposition of adjacent links in oppositely tilted positions as they pass over the wheel.

Referring to Figs. I, II, and VI, it will be seen that the peripheral extent of each of the projections 6 is less than the distance between the endmost surfaces of alternate links, to leave intervals $a$ between the sides of the projection $b$ and the endmost surfaces $c$ of the alternate links $d$. In order to provide a positive driving connection between the wheel and a chain trained over it, the body 1 of the wheel is, within the channel 5 and adjacent each projection 6, provided with an abutment surface 16 for contact with a portion, as $e$, Figs. II and VI, of the exterior surface of an end reach 17 of the link that is adjacent and interlooped with the link supported by that projection.

The surfaces 16 are molded to conform to the configuration of the portion $e$ of the end reaches 17 that they contact, and are spaced peripherally of the wheel at distances equal to the distance between the corresponding portions $e$ of the succeeding links of a chain that is to be used with the wheel. Spacing between the opposed side surfaces 18 of adjacent projections, and between the surface 16 at one projection and the opposed surface 18 of the succeeding projection is, by reason of the limitation of the peripheral extent of the projections 6 mentioned above, greater than the spacing between the outer endmost surfaces of the individual chain links. The effective result of these proportions is that the recesses 7 are longer than the chain links, so that the intervals $a$ occur, which insures proper entry of the links into the recesses, thereby providing proper contact between the links and the abutment surfaces 16. The clearances $a$ should be sufficient to allow for the stretching that normally takes place in a chain. Use of links of too great length to be received in the recesses and properly engaged with the various supporting and driving surfaces of the wheel will result in an outward riding of the chain which leads to its breaking. It is to be noted that the abutment surfaces 16 are duplicated at 19 on the opposite sides of the projections, to enable the driving action to take place in either direction. The wheel may either drive or be driven by the chain, being illustrated as an idler wheel driven by the chain traveling in the direction of the arrows.

From inspection of Figs. IV and V, it will be noted that the surfaces 11 and 12 of the recesses 7 and projections 6 are arranged as plane surfaces, it being unnecessary to mold them to provide rounded coves for reception of the side reaches of the links. The surfaces 16 and 19 are molded to the configuration of the portions of the links that they contact, but as these surfaces are curved inwardly at the bases of the projections 6 and toward the center line of the peripheral channel, the bases of the projections progressively decrease in width as they approach the center line of the wheel. This configuration permits preparation of molds for casting the wheels by simple split patterns divided on the center line of the channel, since there is no undercutting of any surface necessary in preparing a casting mold.

The wheel presents the advantages of avoiding distortion of the positions of the links when they enter or leave it, thereby avoiding whipping of the free reaches of the chain as it runs over the wheel, and avoiding the noise, wear and damage in wheels and chains that have always been present in prior devices of the general type. It presents an article of practical manufacture due to its capacity for molding by simple standard patterns and procedure. Additionally it presents no difficulty in designing a wheel for a particular chain, as the supporting structure is uniform for each link, and a uniform pitch based on the length of the links may be readily established, as distinguished from the complicated calculations necessary to properly lay off a wheel of prior type having pockets for reception of alternate links.

It is particularly to be pointed out, and is illustrated in the drawings, that the chain wheel of my invention is adapted to use with chains of the most common and unspecialized sort composed of a succession of uniform simple elongate bands embraced within the bight of adjacent links. This fact greatly increases the universality and utility of my chain wheel. Not only does it avoid expense in the manufacture of chains purposed for use with the wheel, but also adapts the wheel particularly to chains of the sort which by virtue of a continuous and simple structural organization of their links are preferred for use in pickling baths and machines and for similar uses.

The disclosure herein contained is to be taken as exemplary and illustrative of my invention rather than as imposing specific limitation thereon, and the scope of my invention is to be taken as restricted only by the definition of the claims appended hereto.

I claim as my invention:

1. Means for interengagement with a chain composed of interlooped links, the said means comprising spaced walls enclosing a channel, and projections extended alternately from the opposite walls and extended partially across the channel for supporting adjacent links of a chain in oppositely tilted positions, the respective projections having corresponding surfaces spaced longitudinally of the channel at distances equal to the spacing between corresponding surfaces of the end reaches of links in a chain with which the means is to be used.

2. A chain wheel having a body and spaced walls enclosing between them a channel extended peripherally of the body, each of the said walls comprising a series of peripherally spaced projections extended transversely with the channel and recesses between the said projections, the projections of each wall being opposite the recesses of the other wall, the said recesses having bottom surfaces for underlying contact with side reaches of chain links, and the opposite projections of the other wall having top surfaces spaced outwardly from the said bottom surfaces of the recesses for underlying contact with the other side reaches of such chain links, and the said surfaces of the succeeding opposite projections and recesses supporting in oppositely tilted positions the adjacent links of a chain trained around the wheel.

3. A chain wheel having a channeled periphery, and peripherally spaced projections within the channel and extended alternately from opposite sides thereof for supporting adjacent links of a chain in oppositely tilted positions, the transverse extent of the said projections being limited to provide spaces for reception of side reaches of chain links between them and the opposite walls of the channel, and the said projections having outer surfaces for supporting the other side reaches of such chain links.

4. A chain wheel having a body provided with a peripheral channel, and peripherally spaced projections within the channel and extended alternately from opposite sides thereof for supporting adjacent links of a chain in oppositely tilted positions, the transverse extent of the said projections being limited to provide spaces for reception of side reaches of chain links between them and the opposite walls of the channel, the said projections having outer surfaces for supporting the other side reaches of such chain links, and the body having abutment surfaces within the channel and adjacent the respective projections for contacting surfaces of the end reaches of the links.

5. A chain wheel having a body provided with a peripheral channel and peripherally spaced projections within the channel and transversely extended alternately from opposite sides partially across the channel for supporting adjacent links of a chain in oppositely tilted positions, the transverse extent of the said projections being limited to provide for reception of side reaches of chain links between them and the opposite walls of the channel, the said projections having outer surfaces for supporting the other side reaches of such chain links, the peripheral extent of the respective projections being less than the distance between the outer endmost surfaces of alternate links of a chain with which the wheel is to be used, and the body being provided with an abutment surface adjacent the bottom of the channel and each projection for contact with an outer surface of the end reach of a chain link supported in tilted position by the adjacent projection.

SAMUEL M. RENKIN.